Patented Sept. 29, 1931

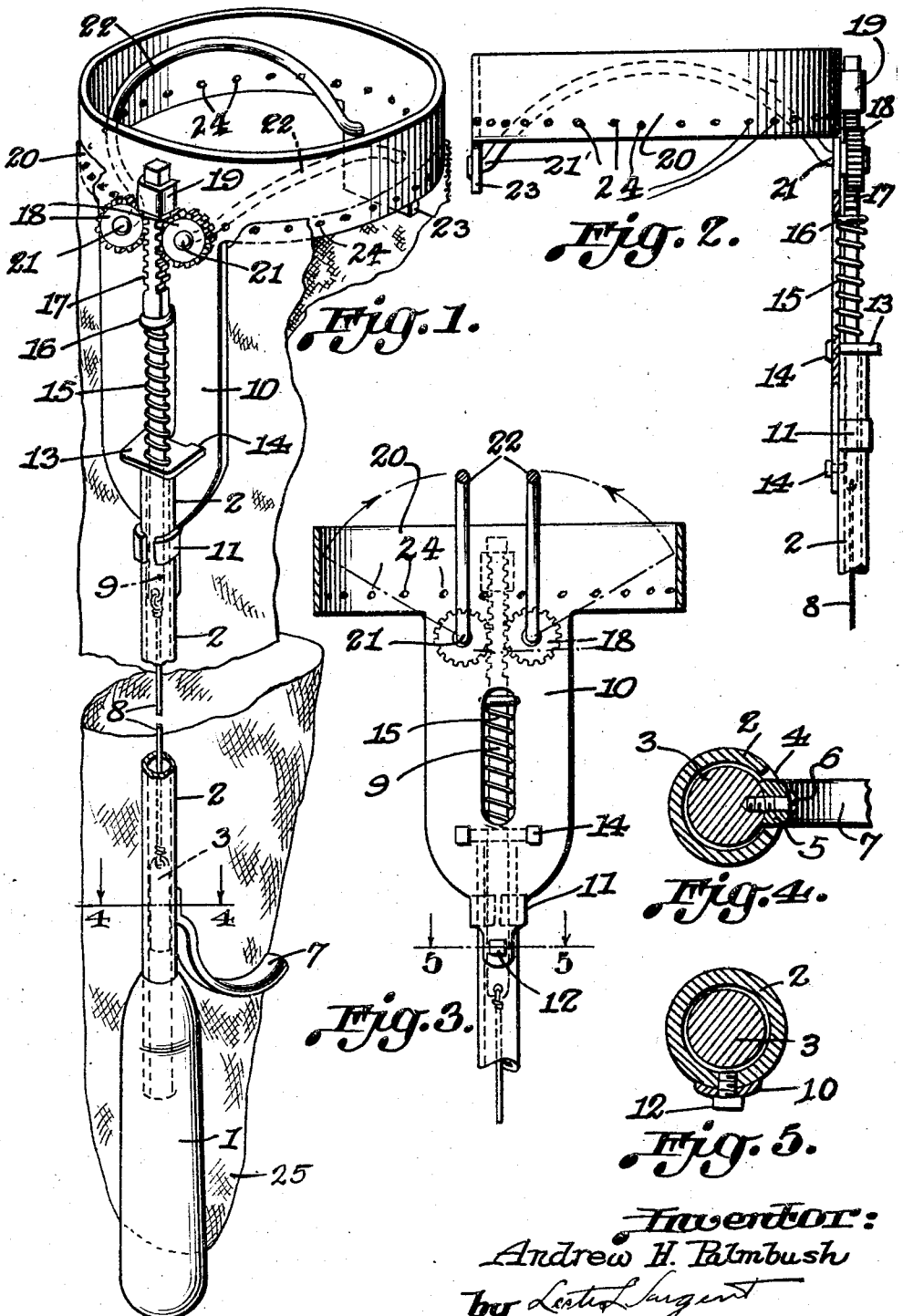

1,825,601

UNITED STATES PATENT OFFICE

ANDREW H. PALMBUSH, OF CONRAD, MONTANA

FRUIT PICKER

Application filed March 7, 1930. Serial No. 434,099.

The object of my invention is to provide a novel fruit picker by means of which fruit on high or distant branches can be readily gathered; to provide a fruit picker which can be held and operated in one hand; to provide a fruit picker of this type having novel actuating mechanism which will more efficiently function to operate the picking arms or wires than will devices heretofore invented in this art; and to provide the novel combination and arrangement of elements disclosed in the accompanying drawings, in which,—

Figure 1 is a perspective view of my invention, a portion of the hollow rod 2 being broken away to show the wire 8 and a portion of the tube 25 also being broken away to shorten the length of the view;

Fig. 2 is a side elevation of my invention, the handle 1, trigger 7, and weight member 3 being omitted.

Fig. 3 is a vertical section through the device looking toward the ring extension plate 10 from the inside thereof;

Fig. 4 is a section on line 4—4 of Fig. 1; and Fig. 5 is a section on line 5—5 of Fig. 3.

Like characters of reference designate like parts in each of the several views.

Referring to the accompanying drawings, I provide a hollow handle 1, on which is mounted a hollow rod 2, to the upper end of which is fastened a ring extension plate 10 by means of the tongues 11, bolt or screw 12, apertured plate 13 and tongues 14, which project through the adjacent slotted portions of the ring extension plate 10, and are bent over on the back thereof, as shown in Fig. 3. Integral with or fastened to ring extension plate 10 is a ring 20 which is provided with spaced apertures 24 to which may be secured a suitable elongated fabric tube (not shown). Ring 20 has an extension 23.

I provide semicircular heavy wires 22 which function as fruit pickers. These wires have outturned ends 21 and 21', which are pivotally mounted respectively in the ring extension plate 10 and in the extension 23, as shown in Figs. 1 and 2. The ends 21 also are affixed to the pinions 18 which pinions mesh with the opposite racks of a double rack bar 17. The double rack bar 17 is formed as an integral part of the rack bar extension 9 which is slidably mounted in the hollow rod 2, apertured plate 13 and strap 19, as shown in Fig. 1.

I provide a wire 8 attached to the lower end of rack bar extension 9 and to the upper end of weight bar 3. I provide a trigger 7, having an end 5 shaped to seat on and affixed to weight bar 3 and slidable in the slot 4 in the lower end of hollow rod 2, as shown in Fig. 4, and attached to said member by suitable means, as by screw 6. I provide a metal strap 19 on ring 20 in which the upper end of the rack bar 17 is slidably mounted. This element serves to keep it in proper mesh with the pinions.

I provide a spring 15 interposed between the apertured plate 13 and collar 16, and bearing against each of those members to tend to cause the picking wires 22 to swing to their wide open position, as shown in Fig. 1. The collar 16 is affixed to the rack bar extension 9 and moves with it to compress the spring 15 while the apertured plate 13 remains stationary.

In operation, the fruit picker is ordinarily grasped in one hand, and the trigger 7 is pressed by the thumb, thereby moving the weight bar 3 downwardly.

The wire 8, bar 9 and rack bar 17 are simultaneously operated with the movement of the trigger 7, thereby rotating the pinions 18 to which the ends 21 of the curved picking wires 22 are affixed or keyed, thereby causing a swinging movement of the wires 22 toward each other, it being possible to swing them easily to a point where their central portions contact with each other.

The fruit on being detached from the limb, glides down through the fabric tube 25 to the hand of the operator, who then releases it into a suitable bag which he carries with him and which may be suitably suspended by a strap around his neck or from his belt, the bag not being claimed as my invention. He is thus able to use one hand for holding the picking apparatus and the other or free hand for receiving the fruit; thus making it possible to work much more rapidly than with devices which have a mere bag to receive the fruit.

The provision of the pinions and double rack bar produces a device which causes the fruit picking wires to swing easily in quick response to a pressure on the trigger; while the spring 15 functions to cause a quick return of the rack bar to its initial position and a consequent quick return of the fruit picking wires 22 to their wide open position, shown in Fig. 1. The fruit is conveyed down the fabric tube which is fastened by suitable means in the apertures 24 of the ring 20 and which serve to prevent bruising of the fruit when picked, the lower end of the tube being grasped by one hand of the operator to stop the fruit and then allow it to drop out through the end of the tube into the bag which he carries with him.

The phrase "rack bar" as used in the following claims shall be construed to cover the rack bar proper designated 17, and the extension thereof designated 9 in the drawings. The extensions 10 and 23 are to be construed as covered and included in the term "ring" in the following claims, as a means for pivotally mounting the wires or fruit picking elements 22.

What I claim is:

1. In a fruit picker, the combination of a handle, a hollow rod, a plate affixed to the upper end of the hollow rod, a ring on the plate, said ring having a fabric tube attached thereto, semicircular wires having outturned ends pivotally mounted in extensions of the ring, opposite pinions on one end of each of the wires, a double rack bar with which each of said pinions mesh, a collar on the rack bar, an apertured plate affixed to the ring extension, a spring interposed between said collar and said apertured plate to tend to raise the rack bar and thus throw the fruit picking wires to an open position, a wire attached to the rack bar, a weight member to which said wire is attached, a trigger affixed to said weight element, the hollow rod being slotted to permit of sliding movement of the trigger.

2. In a fruit picker, the combination of a handle, a hollow rod, a plate affixed to the upper end of the hollow rod, a ring on the plate, a fabric tube attached to the ring and of sufficient length to extend down to the free hand of the operator, semicircular wires having outturned ends pivotally mounted in extensions of the ring, opposite pinions on one end of each of the wires, a double rack bar with which each of said pinions mesh, a collar on the rack bar, an apertured plate affixed to the ring extension, a spring interposed between said collar and said apertured plate to tend to raise the rack bar and thus throw the fruit picking wires to an open position, a wire attached to the rack bar, a weight member to which said wire is attached, a trigger affixed to said weight element, the hollow rod being slotted to permit of sliding movement of the trigger.

3. In a fruit picker, the combination of a handle, a hollow rod affixed to the handle, a ring operatively attached to the upper end of the hollow rod, a fabric tube attached to the ring and of sufficient length to extend down to the hand of the operator, semicircular wires having outturned ends pivotally mounted in extensions of the ring, opposite pinions on one end of each of the wires, a double rack bar with which each of said pinions mesh, a collar on the rack bar, an apertured plate adjacent the upper end of the hollow rod and in which the rack bar is slidably mounted, a spring interposed between the aforesaid collar and the aforesaid apertured plate to tend to raise the rack bar and thereby operate the fruit picking wires to an open position, a wire attached to the rack bar, a weight member to which said wire is attached, a trigger affixed to said weight element, the hollow rod being slotted to permit of sliding movement of the trigger.

4. In a fruit picker, the combination of a handle, a hollow rod affixed to the handle, a ring operatively attached to the upper end of the hollow rod, a fabric tube attached to the ring and of sufficient length to extend down to the hand of the operator, movable members for engaging the fruit or fruit stems, said members being pivotally mounted in extensions of the ring, opposite pinions on one end of each of the wires, a double rack bar with which each of said pinions mesh, a collar on the rack bar, an apertured plate adjacent the upper end of the hollow rod and in which the rack bar is slidably mounted, a spring interposed between the aforesaid collar and the aforesaid apertured plate to tend to raise the rack bar and thereby operate the fruit picking wires to an open position, a wire attached to the rack bar, a weight member to which said wire is attached, a trigger affixed to said weight element, the hollow rod being slotted to permit of sliding movement of the trigger.

5. In a fruit picker, the combination of a handle, a hollow rod, a plate affixed to the upper end of the hollow rod, a ring on the plate, said ring having a fabric tube attached thereto, movable members for engaging the fruit or fruit stems, said members being pivotally mounted in extensions of the ring, opposite pinions on one end of each of the wires, a double rack bar with which each of said pinions mesh, a collar on the rack bar, an apertured plate affixed to the ring extension, a spring interposed between said collar and said apertured plate to tend to raise the rack bar and thus throw the fruit picking wires to an open position, a wire attached to the rack bar, a weight member to which said wire is attached, a trigger affixed to said weight element, the hollow rod being slotted to permit of sliding movement of the trigger.

6. In a fruit picker, the combination of a handle, a hollow rod, a plate affixed to the upper end of the hollow rod, a ring on the plate, a fabric tube attached to the ring and of sufficient length to extend down to the hand of the operator, semicircular wires having outturned ends pivotally mounted in extensions of the ring, opposite pinions on one end of each of the wires, a double rack bar with which each of said pinions mesh, a collar on the rack bar, an apertured plate affixed to the ring extension, resilient means operatively connected with the rack bar to resiliently press same upwardly to operate the fruit picking wires to an open position, a wire attached to the rack bar, a weight member to which said wire is attached, a trigger affixed to said weight element, the hollow rod being slotted to permit of sliding movement of the trigger.

7. In a fruit picker, the combination of a handle, a hollow rod, a plate affixed to the upper end of the hollow rod, a ring on the plate, a fabric tube attached to the ring and of sufficient length to extend down to the hand of the operator, semicircular wires having outturned ends pivotally mounted in extensions of the ring, opposite pinions on one end of each of the wires, a double rack bar with which each of said pinions mesh, a collar on the rack bar, an apertured plate affixed to the ring extension, a spring interposed between said collar and said apertured plate to tend to raise the rack bar and thus throw the fruit picking wires to an open position, a wire attached to the rack bar, a weight member to which said wire is attached, a trigger operatively connected with the wire, the hollow rod being slotted to permit of a sliding movement of the trigger.

ANDREW H. PALMBUSH.